(No Model.) 3 Sheets—Sheet 2.

C. P. STEINMETZ.
SYSTEM OF ELECTRICAL DISTRIBUTION.

No. 605,526. Patented June 14, 1898.

WITNESSES.
A. H. Abell.
B. B. Hull.

INVENTOR,
Charles P. Steinmetz
By Geo. R. Blodgett
Atty.

(No Model.) 3 Sheets—Sheet 3.
C. P. STEINMETZ.
SYSTEM OF ELECTRICAL DISTRIBUTION.
No. 605,526. Patented June 14, 1898.
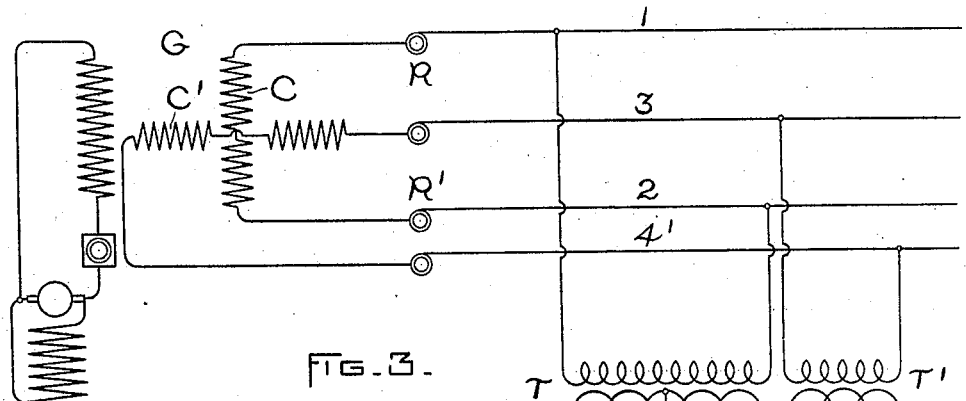
Fig. 3.
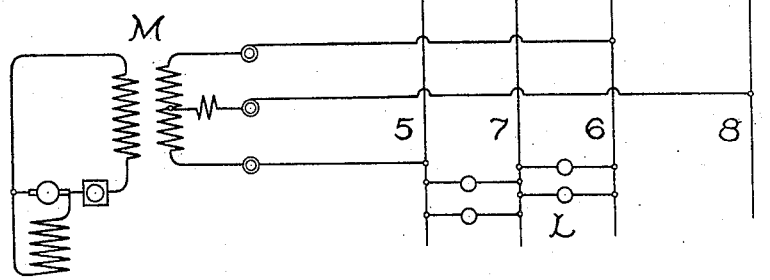
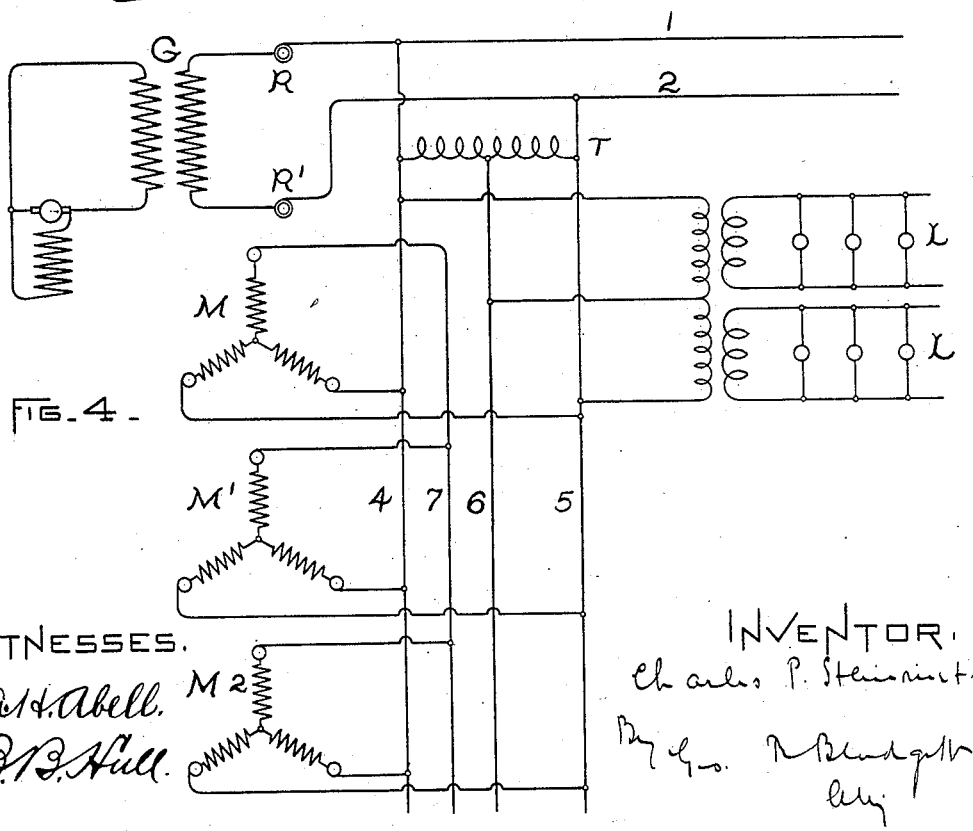
Fig. 4.
WITNESSES.
A. H. Abell.
B. B. Hull.
INVENTOR.
Charles P. Steinmetz
By Geo. R. Blodgett
Atty.

UNITED STATES PATENT OFFICE.

CHARLES P. STEINMETZ, OF SCHENECTADY, NEW YORK, ASSIGNOR TO THE GENERAL ELECTRIC COMPANY, OF NEW YORK.

SYSTEM OF ELECTRICAL DISTRIBUTION.

SPECIFICATION forming part of Letters Patent No. 605,526, dated June 14, 1898.

Application filed June 17, 1897. Serial No. 641,130. (No model.)

*To all whom it may concern:*

Be it known that I, CHARLES P. STEINMETZ, a citizen of the United States, residing at Schenectady, county of Schenectady, State of New York, have invented certain new and useful Improvements in Systems of Electrical Distribution, (Case No. 585,) of which the following is a specification.

The present invention relates to monocylic systems of distribution; and it consists in combining therewith a three-wire system whereby light and power may be efficiently and economically supplied from the same generator. To these ends I provide a source of single-phase electromotive force and connect thereto a three-wire system of the ordinary type, in which the electromotive force across the "outside" wires is equal to the sum of the electromotive forces between the two outside wires and the "neutral" wire. I connect to this three-wire system or to translating devices connected thereto a source of dephased electromotive force. In the preferred form of my invention I connect one terminal of this source of dephased electromotive force to one of the wires of the three-wire system, as the neutral wire, and from the other terminal of the source I carry a fourth or supplementary wire to the distribution system. I then connect single-phase translating devices to the three-wire system in the ordinary way, and I connect multiphase translating devices between any two wires of the three-wire system (but preferably the two outside wires) and the supplementary wire.

Figure 1:
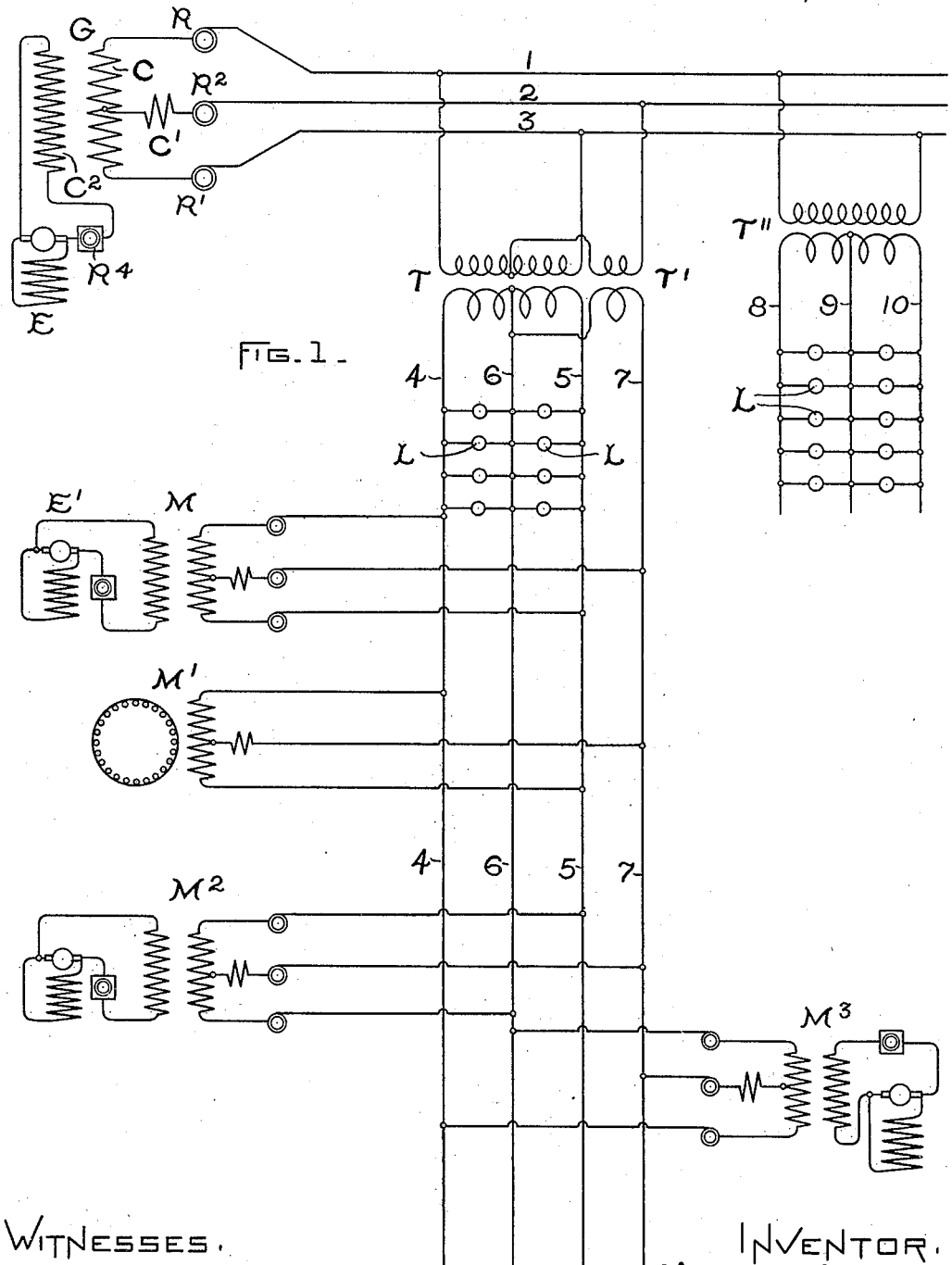
Figure 2:
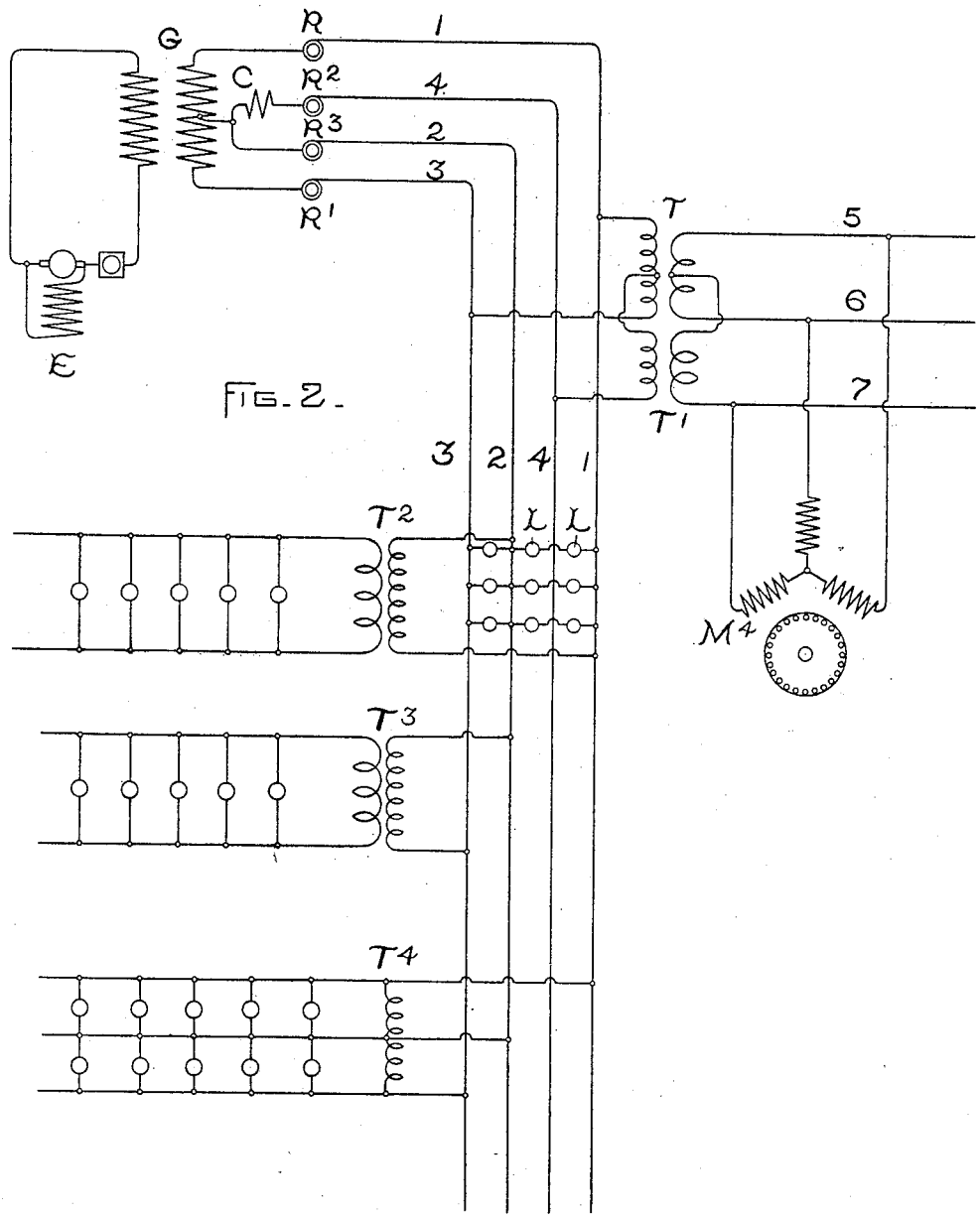

In the drawings attached to this specification, Figure 1 is a diagram of a distribution system embodying my present improvements, and Figs. 2, 3, and 4 are views of slightly-modified forms.

In Fig. 1, G is a generator having an armature-coil C, connected to collector-rings R R', and a second coil C', connected to an intermediate point in the first coil and to a third collector-ring $R^2$. The coil C' is displaced ninety degrees in the field of force relatively to the coil C. E is a shunt-wound direct-current exciter regulated by the rheostat $R^4$ and supplying current to the field-winding $C^2$ of the generator C. Mains 1 2 3 are connected, as shown, to the collector-rings. With this arrangement an electromotive force of displaced phase is maintained upon main 2, as is now well understood in the art, so that the electromotive forces between mains 1, 2, and 3 have a displaced phase relation.

The mains 1 3 extend over the district to be supplied, and transformers are connected to them at suitable points to feed lights or other single-phase translating devices. Such a transformer is shown at T". From the secondary winding extend three wires 8 9 10, which form a three-wire single-phase system. Lights L L or other single-phase translating devices are connected in wherever required; but at points where it is desired to supply current to multiphase translating devices I install two transformers T and T'. The transformer T is similar to the transformer T" already described. The transformer T' is supplied from the coil C' of the generator, and its secondary is interconnected with the three-wire system 4 5 6, as shown. 4 and 5 are the outside wires of the three-wire system, and 6 is the neural wire. Single-phase translating devices may be connected between any two of the wires 4 5 6. Multiphase translating devices may be supplied from any two of the wires 4 5 6 in conjunction with the fourth or supplementary wire 7, which is fed by the transformer T' with an electromotive force displaced from the electromotive force of the three-wire system.

For example, I have shown at M a motor of the monocyclic type whose field-winding is excited by a direct-current machine E'. Its armature-coils, which are arranged in a manner characteristic of the monocyclic system, are connected to the wires 4, 5, and 7. M' is an induction-motor having a closed secondary, and its primary windings are coupled and connected in the same manner as are those of the motor M.

In most cases it is best to couple the motors, as just described, between the outside mains of the three-wire system and the supplementary main; but when a lower voltage is desired in the motor-circuits they may be coupled between the neutral wire and one of the outside mains of the three-wire system and the supplementary wire. Motors M² and M³ are so connected and are similar in character to motors M and M'.

The distribution system shown in Fig. 2 is very similar to that just described. It differs principally in the fact that the neutral main of the three-wire system extends all the way back to the generator instead of starting from one or more of the transformers, as in Fig. 1. The generator G and exciter E represented in this figure are the same as those in Fig. 1 with the addition of a fourth collector-ring R³, which is connected to a central point in the main coil C of the generator-armature. The mains 1 2 3, as shown herein, constitute the three-wire circuit, and the supplementary main is marked 4. The transformers T T', similar to the corresponding transformers in Fig. 1, are connected on the primary side to the mains 1 3 4 and on the secondary side to 5 6 7. The generator shown in this figure is assumed to have its armature-coils so proportioned that there is substantially sixty degrees difference of phase between the mains 1 3 and the main 4, as is the case with the ordinary type of monocyclic generators now in use. In Fig. 1 the transformers are so wound and connected that they operate to change the voltage without shifting the phase relations. In Fig. 2, however, the number and arrangement of turns on the transformers are such that the displacement of phase on the secondary side is one hundred and twenty degrees, and therefore three-phase motors, as M⁴, may be run from the mains 5 6 7. Groups of lamps L are fed from the mains 1 2 3 either directly or through the transformers T² T³ T⁴. At T⁴ there is shown a compensator or single-coil transformer connected to mains 1 2 3 and feeding multiple-series groups of lamps.

In Fig. 3 a system is shown differing from the preceding in the means for maintaining a displaced electromotive force on the supplementary main. The generator G in this form has a coil C, connected to mains 1 2 through collector-rings R R'. An independent coil C', displaced ninety degrees in the field of force, is connected by a circuit 3 4' to the point or points where motors are to be operated. Two transformers T T' are used, as before, the primary coil of T being connected to the circuit 1 2 and the primary coil of T' to the circuit 3 4'. The secondary of the transformer T leads to the outside mains 5 6 of a three-wire system, the neutral main 7 being joined to the center of the secondary coil. The secondary winding of transformer T' has one terminal connected to the supplementary main 8 and the other to the neutral main 7. Lamps L may now be run from the mains 5 6 7 and motors M from the circuit 5 6 8.

In Fig. 4 the power-generator consists of an ordinary single-phase alternator G, connected to mains 1 2. A compensator T, for which of course a suitable transformer or arrangement of transformers may be substituted, is connected across the mains 1 2, and also to mains 4 5 6, forming the three-wire system. Lamps L are shown fed from the mains 4 5 6 through transformers. M M' M² are motors, as before, but in this case three-phase motors having two of their coils connected to the mains 4 5 and the third coil connected to the supplementary main 7. The motors will equalize by transfer of energy over the main 7, and as long as any one of them is running any other can be started by the out-of-phase electromotive force thus created on the fourth or supplementary main.

It will be seen that with my improved system I am able to effect a great economy of copper. For example, in Fig. 1 it is only necessary to run two wires to any building in which lights only are required, while by the addition of a single supplementary wire motors also may be supplied. On the secondary circuits all the advantages of the three-wire system are secured, as well as the advantages of the multiphase systems.

I do not claim herein the specific generator shown in Fig. 2, as such generator forms the subject-matter of my application, Serial No. 536,441, filed January 28, 1895, which application is to be regarded as subordinate to this present application.

What I claim as new, and desire to secure by Letters Patent of the United States, is—

1. In a system of electrical distribution, and in combination, a generator having a main coil, and a supplemental coil at an angle thereto connected at one end to an intermediate point in the main coil, a three-wire distribution system fed from the main coil, and a multiphase translating device fed from both coils.

2. In a system of electrical distribution, a source of current having a main coil, and a supplementary coil connected to an intermediate point in the main coil, means for producing an electromotive force of displaced phase in the supplemental coil, a three-wire single-phase distribution system fed from the main coil, and a multiphase translating device fed from both coils.

3. The combination of a source of single-phase currents, a two-wire circuit leading therefrom, a transformer connected to said circuit, a three-wire single-phase system fed from the secondary of the transformer, and a fourth or supplementary wire on which a dephased electromotive force is maintained interconnected with the three-wire system.

4. The combination of a generator of single-phase currents having a main coil, an additional coil on said generator so displaced as to be the seat of an out-of-phase electromotive force, a two-wire circuit leading from said generator to a transformer, a three-wire single-phase system fed from the secondary of the transformer, and a fourth or supplementary wire fed from the said additional coil, and multiphase translating devices fed from the three-wire system and from the fourth wire.

5. The combination of a source of single-phase current, a single-phase three-wire distribution system fed therefrom, a single supplementary wire, and a source of dephased electromotive force connected between the three-wire system and the supplementary wire, single-phase translating devices and multiphase translating devices, the single-phase translating devices being fed from the three-wire system, and the multiphase translating devices being fed from the three-wire system and from the supplemental wire.

6. The combination with the main single-phase armature-winding of an alternating-current generator, of a transformer which on one side is connected to the said armature-winding and on the other side to a single-phase three-wire system, and an additional source of dephased electromotive force connected to the neutral wire of the three-wire system, and to a fourth or supplementary wire which forms, with two wires of the three-wire system, a multiphase distribution system.

7. The combination with an alternating-current three-wire system of a source of dephased electromotive force connected between the neutral wire of said system and a fourth or supplementary wire, single-phase translating devices connected to the three-wire system, and multiphase translating devices connected to the three-wire system and to the supplementary wire, whereby the four said wires form a complete system suitable for the distribution of light and power.

8. The combination with the main armature-winding of a monocyclic generator, of two rings connected to the terminals of said winding, an additional armature-coil connected at one end to an intermediate point on the said winding and at its other end to a third ring, a field-magnet in inductive relation to said armature, connections from two of the first-mentioned rings to a transformer, a three-wire single-phase system fed from the secondary of said transformer, an additional transformer connected at one end to a wire leading from the third ring and at the other end to an intermediate point in the primary of the first-mentioned transformer, a connection from one terminal of the secondary of said additional transformer to the neutral wire of the three-wire system and from the other terminal to a fourth or supplementary wire, single-phase translating devices connected to the three-wire system, and multiphase translating devices connected to the three-wire system and to the fourth or supplementary wire.

In witness whereof I have hereunto set my hand this 15th day of June, 1897.

CHARLES P. STEINMETZ.

Witnesses:
B. B. HULL,
E. W. CADY.